Jan. 5, 1937.   L. IVERSEN   2,066,565
METHOD AND APPARATUS FOR SHEARING
Filed Oct. 8, 1934
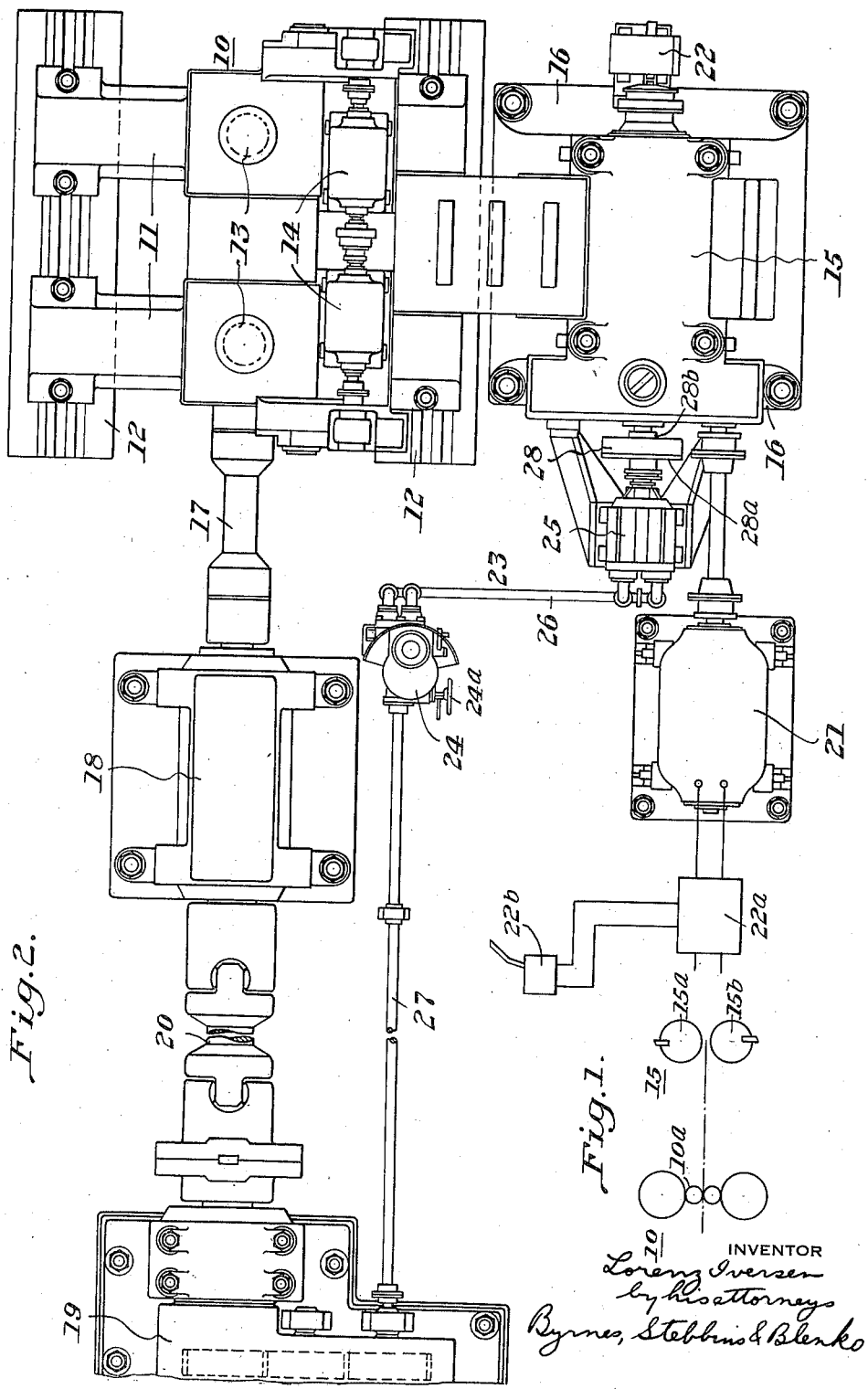

UNITED STATES PATENT OFFICE 2,066,565

METHOD AND APPARATUS FOR SHEARING

Lorenz Iversen, Pittsburgh, Pa., assignor to Mesta Machine Company, Pittsburgh, Pa., a corporation of Pennsylvania Application October 8, 1934, Serial No. 747,291

22 Claims. (Cl. 164—68)

This invention relates to a method and apparatus for shearing and is herein particularly described as applied to the shearing of metal strip. Material of this character is rolled in long lengths and it is desirable to accomplish two distinct sorts of shearing operations. In some cases it is desired to crop the leading and trailing ends of the long length of material and sometimes to make one or two intermediate cuts. In other cases it is desired to shear the material into a large number of pieces of equal length. In view of the fact that the material is rolled at high speeds, it is important that the mechanism function satisfactorily at such speeds for either type of cutting.

In my prior inventions directed to this problem I have employed a flying shear of the rotary type. According to one system which I have successfully employed the shear was driven by an electric motor. This apparatus possessed the advantage of being able to crop the ends of a long strip without waste and it could also be used to shear the strip into a large number of equal lengths (see Patent 1,954,132, dated April 10, 1934). In certain cases, however, it was found that, due to speed variations in the electric motor, a certain amount of variation in individual lengths occurred. I have also employed apparatus wherein the shear was driven from the same power source as the roll stand from which the material is delivered to the shear (see Patent 1,949,716, dated March 6, 1934). In this mechanism a variable speed transmission was employed. This plan has proven to be highly accurate and cuts material to the desired length within exceedingly close limits. However, it is not well adapted for cropping since the most convenient way of using the apparatus is to start the shear when starting the mill and to leave it running continuously, thus cutting the leading end at random, and causing waste.

The present invention satisfactorily performs the operation of economically cropping and cutting accurately to length. It combines the flexibility of the separate motor drive for cropping and the extreme accuracy of the mill controlled drive for cutting to length. According to the present invention I provide means, such as an electric motor, for driving the shear, but interpose between the shear and the roll stand or other feed mechanism which advances material thereto a means which limits the speed of the shear in accordance with the speed of the feed mechanism. The combination gives the flexibility of the separate motor drive, but by imposing a definite speed limit on the shear in accordance with the speed of the feed mechanism, eliminates the variations heretofore encountered in cutting to length with an individually driven rotary shear. A very simple and satisfactory mechanism for this purpose is a variable speed hydraulic transmission driven with the roll stand and effective for driving one of the members of an over-running clutch, the other member of the clutch being connected to the shear. The clutch is so arranged that the shear can stand idle while the mill is running and can run at any speed up to but not beyond that dictated by the over-running clutch. In consequence the shear may be stationary until a piece advancing toward it sets it into operation. The motor can then start up in order to crop the desired length and whenever it is desired to cut the strip to length the motor is kept running with such energy input that it runs as fast as the over-running clutch will permit. If it is desired to crop the front end and to cut the strips into two or more very long pieces and also to crop the trailing end, the electric motor, instead of running continuously, is stopped and started at intervals when it is desired to make a cut.

In the accompanying drawing illustrating a present preferred embodiment of the invention, Figure 1 is a diagram illustrating the relation of the feed mechanism (mill-stand) and the shear, and Figure 2 is a plan view of the apparatus, partly in diagram.

In the illustrated form of the invention the material which is strip is fed from a roll stand 10 which is preferably the last stand of a continuous mill. Figure 2 illustrates the housings 11, bed rails 12, screwdowns 13 and screwdown motors 14 of the mill housings as viewed in plan. Figure 1 shows diagrammatically the work rolls 10a between which the material is fed in a continuous manner to the rotary shear indicated at 15. This shear may be of any suitable construction, for example as illustrated in my prior patents above referred to. It has housings 16 containing cutter rolls 15a and 15b for shearing. The work rolls of the mill 10 are driven through spindles 17 and pinions 18 from a motor drive indicated generally at 19 through a coupling 20. The shear 15 is driven by a motor 21 coupled directly to the shear. A limit switch 22 is employed so that the shear on stopping after any cut will return to a predetermined position. A control 22a, including a flag 22b, is also provided. In actual use the flag 22b will lie in the path of the material so as to actuate the shear when the end of the material passes over the flag. For clarity of illustration it is not shown in such position in the drawing.

As stated, the speed of the driving motor is limited in accordance with the speed of the mill stand 10. For this purpose I provide a mechanism indicated generally by the reference character 23. It comprises a pump 24, a hydraulic motor 25, connecting piping 26, a drive 27 for the pump 24, and an over-running clutch 28. The pump 24, being connected to the drive 19 through the shaft 27, circulates fluid at a rate which for any given speed of the mill stand 10 is constant and is determined as to amount by the adjusting wheel 24a. The motor 25 is driven by such fluid and runs at a speed exactly in accordance with the speed of the mill stand 10. It drives one member 28a of the clutch 28. The other member 28b of such clutch is coupled to the rotor 15a of the shear 15, and the parts of the clutch are so arranged that while the part 28a can run faster than the part 28b, the part 28b cannot run faster than the part 28a. It must also be borne in mind that the motor 25 cannot run at a speed faster than is determined by its driving pump 24 because the fluid, after passing through the motor 25, is returned directly to the pump.

The clutch employed may be of any suitable type, for example, the ordinary free-wheeling drive for automobiles. Preferably, however, it will have several teeth, any one of which may be engaged by the other half of the clutch. Suppose, for example, that it had four teeth. If the first tooth were engaged by the pawl on the other part of the clutch, the two shaft sections would have a definite orientation with respect to one another, which orientation would be maintained so long as the pawl and the tooth were in engagement. Suppose, however, that the speed of the pawl member were checked, so that the toothed portion over-ran the pawl, then depending upon the instant at which the pawl member is speeded up the two clutch members and the shafts to which they are coupled will again have a definite orientation with respect to one another, which may be the same as in the case just mentioned, or, if the four teeth are evenly spaced, 90°, 180° or 270° spaced therefrom. In any case, the clutch definitely limits the speed of the shear to the speed determined by the hydraulic mechanism and yet permits the shear to stand idle or to run at any speed up to the limiting speed. The fact that the parts may be coupled in different orientations is utilized as hereinafter described.

If it is desired merely to crop the ends of the length of material and, perhaps, to cut it once or twice at any intermediate point, the pump 24 is adjusted to drive the member 28a of the over-running clutch at a speed higher than that at which it is desired to run the shear at any time during the parting or cropping operation. The cropping and parting is then effected by starting the shear from rest at the proper time by actuation of the control 22a and/or the flag 22b. The shear is thus started and stopped under manual or automatic control and functions without regard to the speed of the mill stand 10. The limit switch 22 brings the shear rolls back to a predetermined starting operation after each cutting operation.

In case it is desired to cut lengths of material into short pieces of constant length, the hydraulic drive is adjusted so that the member 28a runs at such a speed as will cause the shear 15 to be operated at a speed to produce the desired length of cut. The control 22a for the motor is then adjusted so that the motor 21, which is of the variable speed type, tends to run the shear at a speed slightly above that at which the member 28a is driven. Under these circumstances the member 28b tries to over-haul the member 28a. However, it cannot speed up the member 28a because of the hydraulic mechanism, and the motor 21 therefore runs at a speed corresponding to the speed of the mill stand 10. If for some reason there should be any variation in the speed of the mill stand 10, a corresponding adjustment of the shear speed will automatically result, and in any event the shear when put into operation will cut accurately to the desired length. Since the motor 21 tends to run faster than the speed determined for it by the control mechanism, any current or load variations which would ordinarily tend to vary the speed of the motor 21 and thus affect the accuracy of the shearing no longer have any effect.

When using the shear for cutting to lengths the shear 15 will be stationary until the leading end of the strip strikes the flag 22b. The motor may then be energized and brought rapidly up to speed for cropping. By the time the cropping has been effected, the motor will have been brought up to the top speed determined by the control mechanism and, if such speed is maintained thereafter, it will continue to cut accurately to length until the trailing end of the piece passes the flag 22 and thus brings the shear to rest.

In certain cases, particularly where it is desired to cut long lengths, some difficulty is incurred with the mode of operation just described. This is due to the fact that if a long length is to be cut the peripheral speed of the shear blades must be quite slow as compared with the linear speed of the stock. I have demonstrated that contrary to previously accepted principles it is possible to vary the peripheral speed of the rolls considerably from the linear speed of the stock and still obtain satisfactory cutting. However, there is a reasonable limit upon the amount of variation and if it is attempted to exceed such limit some difficulty may be incurred with buckling of the stock and especially if it be quite thin and in the hot state. In order to overcome this difficulty and to increase the flexibility of the shear, I simply slow down for an interval between cuts. In this use of the invention the shear rotor has its top speed determined by the hydraulic gear mechanism, but instead of running constantly at that speed as in the procedure just above described, the shear rotor will run at the limiting speed during cutting, then will slow down, and then will speed up again in time for another cut. When the shear again comes up to speed the orientation of the two clutch members may be the same as during the preceding high speed phase of operation, or it may be different. In either case the length is determined by the number of revolutions which the clutch member geared to the feed mechanism has made and high accuracy is maintained. By providing for the clutch members coming into engagement at different orientations, a wide range of cuts without undue speed differences between shear blades and stock may be effected.

The electrical control mechanism for slowing down and speeding up the shear rotor may be of any desired design. Such control mechanism is well known in the art and need not be described in detail. Suffice to say that such mechanism can be relied upon to operate with sufficient nicety to insure that after any low speed phase of operation the shear rotor will be speeded up so as to bring the proper tooth of the clutch into engagement with its pawl so as to get the desired orientation of the two clutch members when the shear has been brought up to speed. Accuracy sufficient for this purpose can be had even though there will be current fluctuations which make it unsafe to rely on mere electrical control for determining the exact point of cut.

In certain instances the clutch employed may be of a different type. For example, it may be an ordinary plate or jaw clutch automatically operated. This is particularly so where mere cropping is to be accomplished and yet it is desired that the speed of the shear be nicely correlated with the speed for the feed mechanism as, for example, when cutting very thin material at high speed.

My invention may be employed not only in connection with a continuous mill, but with any other type of mill and independently of a mill. In the last case, instead of the roll stand 10, a pair of feed rolls or other feeding mechanism may be employed.

I have illustrated and described a present preferred embodiment of the invention, but it will be understood that this is by way of illustration only and the invention may be otherwise embodied or practiced within the scope of the following claims.

I claim:

1. Shearing apparatus comprising a shear, feeding mechanism adapted to advance material thereto, means for driving the shear, a control means, and means other than the driving means for limiting the motion of the shear in accordance with the motion of the feeding mechanism.

2. Shearing apparatus comprising a rotary shear, feeding mechanism adapted to advance material thereto, means for driving the shear, a control for the drive means, and means other than the driving means for limiting the rotative speed of the shear in accordance with the motion of the feeding mechanism.

3. Shearing apparatus comprising a shear, rolls adapted to feed material to the shear, means for driving the shear, a control for the drive means, and means other than the driving means for limiting the motion of the shear in accordance with the motion of the feed rolls.

4. Shearing apparatus comprising a shear, feeding mechanism adapted to advance material thereto, means for driving the feed mechanism, an independent shear drive, and a hydraulic gear connection between the shear and the feeding mechanism for limiting the shear speed.

5. Shearing apparatus comprising a shear, feed means therefor, a drive for the feed means an independent shear drive, and a device movable at a speed corresponding to the speed of the feed means and affective for correspondingly limiting the speed of the shear, said device being adapted to act only in opposition to the shear drive.

6. Shearing apparatus comprising a shear, feed means therefor, means independent of the feed means for driving the shear, a device movable at a speed corresponding to the speed of the feed means and effective for correspondingly limiting the speed of the shear, said device being adapted to act only in opposition to the shear drive, and means for adjusting the speed ratio between the feed means and said speed limiting means.

7. Shearing apparatus comprising a shear, feed means therefor, means independent of the feed means for driving the shear, and an overrunning clutch having one member operatively connected with the feed means and movable at a speed corresponding thereto, and having another member operatively connected with the shear, the over-running clutch being effective for limiting the speed of the shear to a speed corresponding to that of the feed means.

8. Shearing apparatus comprising a shear, feed means therefor, means for driving the shear independently of the feed means, and a pair of relatively movable co-acting members, one having its speed limited in accordance with the speed of the feed means, the other being operatively connected with the shear, the first of said members being effective for limiting the speed of the second of such members, but ineffective for driving the second member.

9. Shearing apparatus comprising a shear, feed means therefor, means for driving the shear independently of the feed means, a speed limiting device having one member operatively connected with the shear, and having a second member effective for limiting the speed of the first-mentioned member, the second member being operatively connected with the feed means and being ineffective for driving the first-mentioned member.

10. Shearing apparatus comprising a shear, feed means therefor, means for driving the shear independently of the feed means, a speed limiting device having one member operatively connected with the shear, and having a second member effective for limiting the speed of the first-mentioned member, the second member being operatively connected with the feed means and being ineffective for driving the first-mentioned member, the connection between the second member and the feed means including a variable speed transmission.

11. Shearing apparatus comprising a shear, an electric motor for driving the same, means for controlling the motor, feed means for supplying material to the shear, and a speed limiting device operatively connected with and driven at a speed corresponding to the speed of the feed means and effective for limiting the speed of the shear, said device acting only in opposition to the shear drive.

12. In the method of shearing, the steps consisting in supplying material to be sheared from a feed mechanism to a shear, driving the shear independently of the feed mechanism, limiting the speed of the shear in accordance with the speed of feeding, and supplying sufficient energy to the shear drive to keep it up to the limiting speed thus determined.

13. In the method of shearing, the steps consisting in supplying material to be sheared from a feed mechanism to a shear, holding the shear at rest until the leading end of the material is advancing toward the shear, starting up the shear when the leading end of the material has reached a predetermined point in its travel toward the shear, thereby to crop the material, and thereafter while the feed mechanism continues to feed the work piece to the shear, driving the shear independently of the feed mechanism but limiting its speed in accordance with the speed of the feed mechanism, and constantly maintaining a predetermined ratio between the velocities of the material and the shear.

14. In the method of shearing, the steps consisting in advancing material to a shear at a predetermined rate, driving the shear independently of the material, and constantly restraining the shear to a speed proportional to that at which material is advanced.

15. In the method of shearing the steps consisting in feeding material to a rotary shear, driving the shear independently of the material, and constantly limiting the speed of the shear to a value having a predetermined ratio to the rate of advancing material thereto.

16. In the method of shearing the steps consisting in feeding material to a rotary shear, driving the shear independently of the material, limiting the speed of the shear in accordance with the rate of advancement of the material, effecting a cut while the shear speed is so limited, varying the ratio between speed of shear and speed of advancing material, and then again limiting the speed of the shear in accordance with the speed of the advancing material, and effecting another cut.

17. In the method of shearing the steps consisting in supplying material to a feed means, actuating the feed means to supply material to a rotary shear, driving the shear independently of the feed means, operatively engaging the feed means and the shear so as to limit the shear speed to a speed determined by the feed means, cutting the material while the shear speed is so limited, changing the speed of the shear from such limited speed while continuing to feed material through the shear, then again so limiting the speed of the shear, and effecting another cut.

18. In the method of shearing the steps consisting in supplying material to a feed means, actuating the feed means to supply material to a rotary shear, driving the shear independently of the feed means, operatively engaging the feed means and the shear so as to limit the shear speed to a speed determined by the feed means, cutting the material while the shear speed is so limited, slowing the shear from the limiting speed, and then again speeding up the shear to the limiting speed and effecting another cut.

19. In the method of shearing the steps consisting in supplying material to a feed means, actuating the feed means so as to feed material to a rotary shear, driving the shear independently of the feed means, operatively engaging the shear and the feed means in a desired instantaneous relationship, and, while maintaining such relationship, shearing the material, then changing the instantaneous positional relationship between the feed means and the shear, and again cutting the material.

20. Shearing apparatus comprising a shear, feeding mechanism adapted to advance material thereto, means for driving the shear, a control means, and means adapted to act only in opposition to the drive means for limiting the motion of the shear in accordance with the motion of the feeding mechanism.

21. Shearing apparatus comprising a shear, feeding mechanism adapted to advance material thereto, means for driving the shear, and means adapted to act only in opposition to the drive means for limiting the speed of the shear in accordance with the speed of the feeding mechanism.

22. Shearing apparatus comprising a rotary shear, feed rolls adapted to advance material thereto, means for driving the shear, and an overrunning clutch mechanism operatively connecting the driving means and the shear, the overrunning clutch mechanism being adapted to act only in opposition to the drive means for the shear, for limiting the rotative speed of the shear in accordance with the speed of the feed rolls.

LORENZ IVERSEN.